Patented Sept. 29, 1931

1,825,211

UNITED STATES PATENT OFFICE

LEO SCHLECHT AND WALTER SCHUBARDT, OF LUDWIGSHAFEN-ON-THE-RHINE, AND FRANZ DUFTSCHMID, OF HEIDELBERG, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

RECOVERY OF METALS AND METAL COMPOUNDS SOLUBLE IN AMMONIACAL LIQUORS

No Drawing. Application filed March 29, 1928, Serial No. 265,810, and in Germany April 27, 1927.

This invention relates to the recovery of metals and metal compounds, which are soluble in ammoniacal liquors and which are hereinafter referred to for the sake of brevity as metals, from materials containing the same.

Many difficulties are encountered in the treatment of materials containing silver, copper or zinc and the like, by leaching with ammonia or with solutions of ammonium salts containing free ammonia, because these metals or their compounds generally dissolve too slowly in the liquor. In order to overcome these difficulties it has already been proposed that the metals should be rendered more readily soluble by a preliminary oxidation or reduction treatment at certain temperatures. This method of procedure however has not furnished any satisfactory results, especially when, as is often the case with ores and intermediate metallurgical products, the material contains silver in addition to zinc and copper, the solubility of that metal being influenced only to an inappreciable extent by such preliminary treatment.

We have now found that substances, which contain the metals above referred to in a form, which is sparingly soluble in ammonia, may be leached with practical completeness in a short time if first subjected to a chlorination treatment at an elevated temperature, and then leached with ammonia, or with solutions of ammonia salts, which may, as required, contain free ammonia as well, the said leaching liquors being hereinafter referred to for the sake of brevity as ammoniacal solutions. The individual metals may then be recovered from the resulting solutions in any known or suitable manner, as for example by precipitation or electrolysis. According to this manner of working it is possible, for example, to recover silver even from ores from which hitherto it could only be obtained by smelting or by the uneconomical process of leaching with acid solutions. In the preliminary chlorination treatment, the metals to be recovered, such as silver, nickel, cobalt, copper and zinc, are almost completely chlorinated, under the proper conditions of working, before any substantial amounts of other constituents which are for the most part present, such as calcium, aluminium and magnesium compounds have been transformed into chlorids so that it is possible to operate with merely that amount of chlorination agent needed to chlorinate the metals to be leached, and this is of great importance as regards the profitable application of the present invention.

The chlorination may be effected with all the usual chlorination agents, such as gaseous chlorine, alkali metal or alkaline-earth metal chlorids, magnesium chlorid and the like, and preferably at temperatures at which no substantial quantities of the resulting chlorids are volatilized, and, in some cases, the operation may be carried out under pressure. According to the nature of the material under treatment, the process may be carried out, either under simultaneous, prior or subsequent oxidizing or reducing conditions. When different metals are present in the material to be leached, care must be taken, for example by a short oxidation prior to leaching to prevent a base metal being present, either in the metallic state or in a low stage of oxidation, during the leaching process, because this would act as a precipitant on the nobler metals already in solution. In the case of sulfur-bearing materials it is also necessary to ensure the destruction of any sulfids, already present or formed during the chlorination or any other preliminary treatment, since otherwise the treatment with ammonia would furnish ammonium sulfid which would precipitate, as sulfids, such metals whose sulfids are difficultly soluble in ammoniacal solution.

The said process is considerably improved by leaching the chlorinated materials with water, preferably at a somewhat elevated temperature prior to treating them with solutions of ammonia or ammonium compounds. The result obtained is that on treating the metalliferous material with ammonia and the like, liquors free from chlorine are recovered. This is very advantageous with regard to their further treatment, inasmuch as the absence of chlorids greatly facilitates the recovery of the metals, especially of copper, whether by fusion or by electrolysis and also prevents corrosion of the apparatus. An additional advantage is also offered in that the chlorination agent can be easily recovered from the aqueous solution, in a form in which it can again be employed in the process. If the raw materials which come into question contain large amounts of basic constituents, such as lime, it is usual to employ only so much of the chlorinating agent that, for the most part, only the heavy metals are chlorinated while the basic constituents remain unchanged, the leaching with water, for example in the presence of copper or copper chlorid, being then generally accompanied by a reaction according to the equation

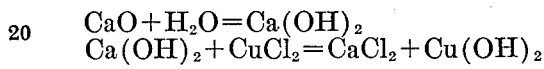

The chlorids of the other heavy metals also react in a similar manner, with the exception of silver chlorid, which remains intact, but is usually present in only small amounts. According to this method of working, almost the whole of the chlorid combined with, for example, calcium or magnesium, passes into solution, whilst the heavy metals remain in the residue in a form which is practically free from colorine and is readily soluble in solutions of ammonia or ammonium salts. In the event of the initial material containing insufficient amounts of basic constituents, such an amount of basic substances, such as lime, is added prior to or during the treatment with water that no heavy metal passes into solution.

The resulting aqueous solution of chlorids, free from salts of heavy metals, still contains, in some cases, a little dissolved silver chlorid, but this can easily be separated as for example, by cementation. The residual liquor can often be directly employed for chlorinating fresh charges of the raw material. By repeated use in the leaching process it may become so highly enriched that concentration by evaporation prior to its employment for chlorination becomes unnecessary, all that is required being to make the raw material into a paste with the enriched liquor, by which means intimate admixture with and thorough penetration of the material with the chlorination agent is obtained. In cases where the chlorination is effected with ammonium chlorid, the solution of alkaline earth metal chlorid obtained on leaching with water may be converted with ammonia and carbon dioxid, ammonium chlorid being thus again formed and calcium carbonate precipitated, the latter being used if desired, as an addition in the extraction with water of fresh quantities of roasted material.

In treating the residue from the water leaching with solutions of ammonia or ammonium salts, the metals dissolve just as quickly as without previous leaching with water, but the recovery of the heavy metals from the liquor is effected far more quickly and economically, because there are no longer any disturbing chlorids present.

The following examples will further illustrate the nature of the said invention, which however is not limited thereto. The parts are by weight.

*Example 1*

Crushed copper schist, containing 2.4 per cent of copper and 0.009 per cent of silver, is first treated with chlorine gas at 600° C. and then leached with an 8 per cent solution of ammonium carbonate containing 4 per cent of free ammonia until the percentage of the copper in the liquor ceases to increase. In this manner 93 per cent of the silver, 80 per cent of the nickel, 91 per cent of the copper and 70 per cent of the zinc, pass into solution as complex ammonium compounds.

*Example 2*

10 parts by weight of a crushed copper schist, containing 2.9 per cent of copper, 0.8 per cent of zinc, 0.014 per cent of silver, 0.03 per cent of nickel and 0.02 per cent of cobalt are thoroughly mixed with 1 part of hydrated magnesium chlorid, and roasted to dark red heat, while damp air is passed over the charge. The calcined product is then leached with one and a half times the amount of an 8 per cent solution of ammonium carbonate, which also contains 4 per cent of free ammonia at ordinary temperature. In this manner 75 to 80 per cent of the silver and 80 to 90 per cent of the other metals pass into solution as complex ammonium compounds.

*Example 3*

10 parts of a ground copper schist, containing 3 per cent of copper, 0.8 per cent of zinc, 0.014 per cent of silver, 0.035 per cent of nickel, 0.025 per cent of cobalt, 13.2 per cent of calcium oxid and 8.2 per cent of magnesium oxid and to which 1 part of magnesium chlorid is added, are heated at low red heat, in a current of air. The roasted material is then treated with warm water, which extracts over 90 per cent of the chlorine present. The aqueous chlorid liquor is at first employed to replace water in leaching fresh quantities of roasted material, and thus becomes enriched with chlorids and suitable for use as the chlorination agent when a sufficient concentration has been attained.

The roasted product, freed from chlorine, is leached with an 8 per cent solution of ammonium carbonate, containing 4 per cent of free ammonia, whereupon 85 to 90 per cent of the copper, 70 per cent of the zinc and 70 to 80 per cent of the silver, cobalt and nickel soon pass into solution. The silver is precipitated from the resulting liquor by means of copper turnings, the other metals being precipitated by driving off the ammonia, and then separated by electrolysis.

*Example 4*

10 parts of a ground copper schist of the above composition are first subjected to oxidative roasting at a low red heat, and then chlorinated by roasting with an addition of one part of ammonium chlorid, after which it is treated, first with warm water and then with ammoniacal liquor. The aqueous extract contains over 90 per cent of the added chlorine in the form of alkaline earth metal chlorids. The aqueous solution is treated with the gases obtained in the roasting process and containing ammonia and carbon dioxid, calcium being precipitated and ammonium chlorid recovered.

In the treatment with ammoniacal liquor, 90 per cent of the copper, zinc, nickel and cobalt, and 75 to 80 per cent of the silver, contained in the initial material, are extracted.

What we claim is:

1. A process for the recovery of metals, which are soluble in ammoniacal liquors, which comprises subjecting materials containing the said metals to a chlorinating roasting treatment and then leaching with an ammoniacal solution.

2. A process for the recovery of metals, which are soluble in ammoniacal liquors, which comprises subjecting materials containing the said metals to a chlorinating roasting treatment and then leaching with a solution of an ammonium salt.

3. A process for the recovery of metals, which are soluble in ammoniacal liquors, which comprises subjecting materials containing the said metals to a chlorinating roasting treatment and then leaching with a solution of an ammonium salt containing free ammonia.

4. A process for the recovery of metals, which are soluble in ammoniacal liquors, which comprises subjecting materials containing the said metals to a chlorinating roasting treatment with only so much of the chlorination agent as is required for chlorinating the metals to be recovered and then leaching with an ammoniacal solution.

5. A process for the recovery of metals, which are soluble in ammoniacal liquors, which comprises subjecting materials containing the said metals to a chlorinating roasting treatment and subjecting any base metals present in a low form of oxidation to a short oxidation treatment and then leaching with an ammoniacal solution.

6. A process for the recovery of metals, which are soluble in ammoniacal liquors, which comprises subjecting materials containing the said metals to a chlorinating roasting treatment and destroying any sulfids present in the materials, which are capable of forming ammonium sulfid with ammonia and then leaching with an ammoniacal solution.

7. A process for the recovery of metals which are soluble in ammoniacal liquors which comprises subjecting materials containing the said metals to a chlorinating roasting treatment, leaching them with water and subsequently with an ammoniacal solution.

8. A process for the recovery of metals which are soluble in ammoniacal liquors which comprises subjecting materials containing the said metals to a chlorinating roasting treatment, leaching them with water at a somewhat elevated temperature and subsequently with an ammoniacal solution.

9. A process for the recovery of metals which are soluble in ammoniacal liquors which comprises subjecting materials containing the said metals to a chlorinating roasting treatment, leaching them with water in the presence of basic substances and subsequently with an ammoniacal solution.

10. A process for the recovery of metals which are soluble in ammoniacal liquors which comprises subjecting materials containing the said metals to a chlorinating roasting treatment, leaching them with water and subsequently with an ammoniacal solution and returning the chlorids contained in the liquors to the process.

11. A process for the recovery of metals which are soluble in ammoniacal liquors, which comprises subjecting a material containing at least one of the said metals in addition to calcium to a chlorinating roasting treatment and then leaching with an ammoniacal solution.

12. A process for the recovery of metals which are soluble in ammoniacal liquors, which comprises subjecting a material containing at least one of the said metals in addition to calcium to a chlorinating roasting treatment and then leaching with a solution of an ammonium salt.

13. A process for the recovery of metals which are soluble in ammoniacal liquors, which comprises subjecting a material containing at least one of the said metals in addition to calcium to a chlorinating roasting treatment and then leaching with a solution of an ammonium salt containing free ammonia.

14. A process for the recovery of metals which are soluble in ammoniacal liquors, which comprises subjecting a material containing at least one of the said metals in addition to calcium to a chlorinating roasting treatment with only so much of the chlorination agent as is required for chlorinating the metals to be recovered, and then leaching with an ammoniacal solution.

15. A process for the recovery of metals which are soluble in ammoniacal liquors, which comprises subjecting a material containing at least one of the said metals in addition to calcium to a chlorinating roasting treatment, leaching the roasted material with water and then leaching with an ammoniacal solution.

16. A process for the recovery of metals which are soluble in ammoniacal liquors, which comprises subjecting a material containing at least one of the said metals in addition to calcium to a chlorinating roasting treatment, leaching the roasted material with water and then leaching with a solution of an ammonium salt.

17. A process for the recovery of metals which are soluble in ammoniacal liquors, which comprises subjecting a material containing at least one of the said metals in addition to calcium to a chlorinating roasting treatment, leaching the roasted material with warm water and then leaching with a solution of an ammonium salt containing free ammonia.

18. A process for the recovery of metals which are soluble in ammoniacal liquors, which comprises subjecting a material containing at least one of the said metals in addition to calcium to a chlorinating roasting treatment with only so much of the chlorinating agent as is required for chlorinating the metals to be recovered, leaching the roasted material with warm water and then leaching with an ammoniacal solution.

19. A process for the recovery of metals of the group consisting of copper, zinc, nickel, cobalt and silver from copper schist which comprises subjecting said material to a chlorinating roasting treatment and then leaching with an ammoniacal solution.

20. A process for the recovery of metals of the group consisting of copper, zinc, nickel, cobalt and silver from copper schist which comprises roasting said material in mixture with magnesium chloride, leaching with warm water and then leaching with a solution of an ammonium salt containing free ammonia.

In testimony whereof we have hereunto set our hands.

LEO SCHLECHT.
WALTER SCHUBARDT.
FRANZ DUFTSCHMID.